United States Patent [19]

Halstead et al.

[11] 3,805,154
[45] Apr. 16, 1974

[54] INTERVAL TIMING MECHANISM FOR A MAXIMUM DEMAND METER

[75] Inventors: Kenneth G. Halstead; Eugene C. Benbow, both of Raleigh, N.C.

[73] Assignee: Westinghouse Electric Corporation, Pittsburgh, Pa.

[22] Filed: Sept. 11, 1972

[21] Appl. No.: 287,922

[52] U.S. Cl. ........ 324/103 R, 74/436, 235/144 MA
[51] Int. Cl. ...................... G01r 19/16, G06c 15/42
[58] Field of Search........... 324/103 R; 74/409, 436; 235/144 MA

[56] References Cited
UNITED STATES PATENTS
2,497,678 2/1950 MacIntyre et al................ 324/103 R Primary Examiner—Alfred E. Smith
Assistant Examiner—Ernest F. Karlsen
Attorney, Agent, or Firm—R. W. Smith

[57] ABSTRACT

An improved interval timing mechanism for a maximum demand meter has a single intermittent motion arrangement including a continuously driven shaft carrying a single gear tooth projection which intermittently engages complementary shaped gear teeth of an intermittent driven shaft. The uniform driving engagement effected between the shafts during the intermittent shaft movement precisely controls a periodic reset operation within the demand meter.

6 Claims, 4 Drawing Figures

INTERVAL TIMING MECHANISM FOR A MAXIMUM DEMAND METER

CROSS REFERENCE TO RELATED PATENTS

This application is related to U.S. Pat. Nos. 3,136,947 issued June 9, 1964 and 3,406,338 issued Oct. 15, 1968 to E.C. Benbow and U.S. Pat. No. 3,421,084 issued June 7, 1969 to E.C. Benbow et al and assigned to the assignee of this invention.

BACKGROUND OF THE INVENTION

It is known to combine a demand meter with an energy measuring unit of the type utilized in measuring the consumption of electrical energy. A maximum demand indicating member measures the maximum demand of the measured energy over predetermined fixed time interval, for example, 15 or 30 minutes.

An interval timing mechanism is usually provided in the register of a maximum demand meter to reset a resettable drive which operates the maximum demand indicator in response to the operation of the measuring unit. At the end of each demand interval the resettable drive means is returned to an initial start condition so as to start at a zero point beginning with the next demand period.

Many of the prior art interval timing mechanisms include a relatively large number of gears and associated shafts to provide the proper timing operation and further include multiple intermittent motion transmitting arrangements to precisely control the time required to provide the resetting operation as well as to control the overall demand interval. Accordingly, it is desirable to simplify the arrangement of such interval timing mechanisms and to provide precise control thereof with a minimum of torque forces so as to reduce wear and increase the reliable use of a mechanism.

SUMMARY OF THE INVENTION

In accordance with the present invention and improved interval timing mechanism for a maximum demand meter includes a constant rotatable input shaft supporting a single gear tooth projection having an involute configuration. An output shaft supports a multiple tooth gear having an involute tooth configuration complementary to the single tooth projection and is intermittently engaged by the tooth projection to effect a desired intermittent rotation of the output shaft. A resettable drive operates a demand indicating member in response to a measuring unit and is operated to return the demand indicating member to an initial condition during a minimum and substantially constant reset period. Control of the resettable drive is provided by the intermittent rotation of the output shaft of the interval timing mechanism.

It is a general object of this invention to provide an improved interval timing mechanism for a maximum demand meter having a simple and reliable intermittent motion arrangement for precisely controlling a minimum reset time operation. It is a further object of this invention to provide an interval timing mechanism including a minimum of parts which are easily assembled in a precisely controlled relationship so as to be operated at reduced torque while effecting intermittent movement by uniform driving engagement between a continuously rotatable shaft and an intermittently rotatable shaft.

These and other features of this invention will become apparent from the description of the preferred embodiment illustrated in the drawings.

DESCRIPTION OF THE PREFERRED EMBODIMENT

Figure 1:
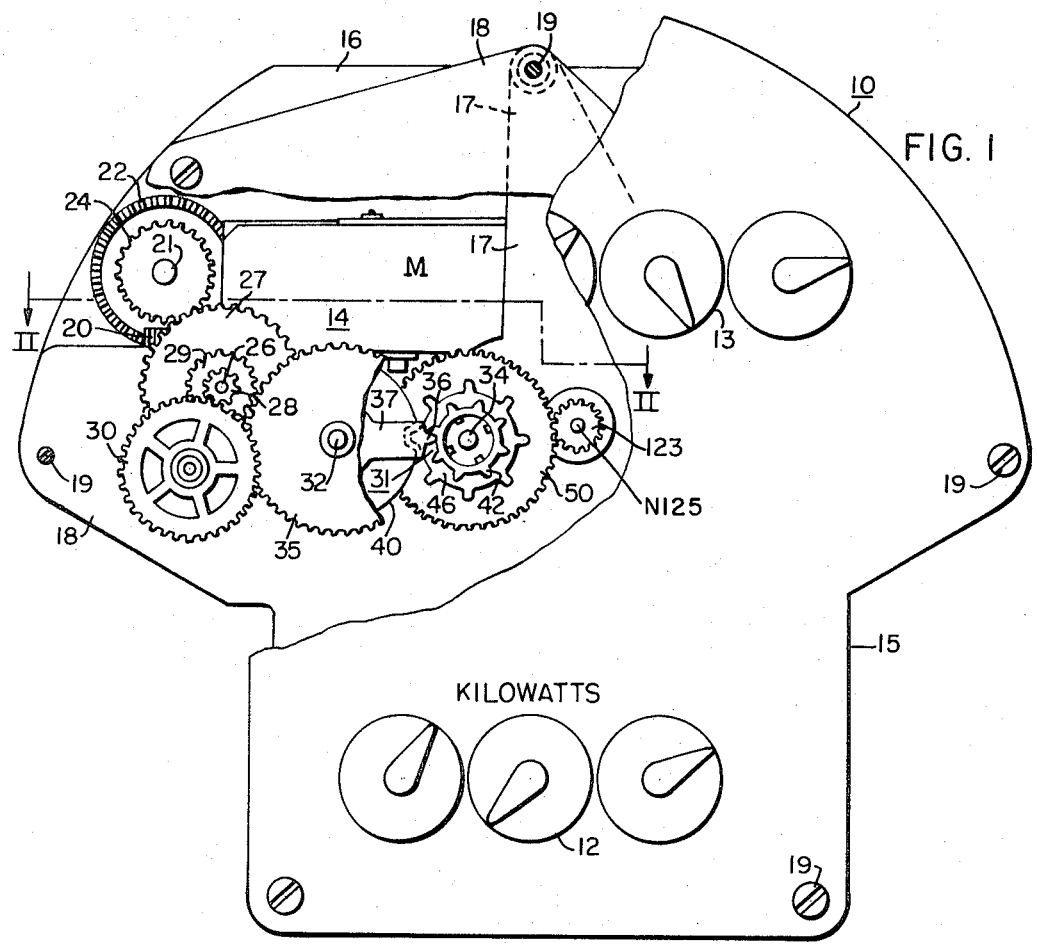
FIG. 1 is a front plan view of a maximum demand meter register including the interval timing mechanism of this invention with parts of the register removed.

Referring now to the drawings and more particularly to FIG. 1 there is shown a register 10 of a maximum demand meter generally of the type disclosed in the U.S. Pat. Nos. 3,136,947 and 3,406,338 to E. C. Benbow. The register 10 is a modified form having a clock-type dial readout providing the demand indicator 12 which may be adapted in such a register as disclosed in the U.S. Pat. No. 3,421,084 to E.C. Benbow et al issued June 7, 1969. The demand meter register 10 includes a measuring unit described in the aforementioned patents driven by the shaft of an induction type watthour meter movement and includes associated indicators 13 which provide an indication of the electrical energy consumed. The demand indicator 12 is associated with a gearing mechanism to provide a variable function of the measuring unit in indicating the maximum of electrical power consumed during a short time interval. Such gearing is disclosed in the aforementioned U.S. Pat. No. 3,421,084 which is driven by a pusher element as disclosed in either of the aforementioned U.S. Pat. Nos. 3,136,947 or 3,406,338 which have a pointer type of indicator as distinguished from a dial type shown in FIG. 1 with such dial being disclosed and claimed in the aforementioned U.S. Pat. No. 3,421,084. A maximum demand meter of this type is also described in Publication I.L. 42-302.3A dated November 1970 available from Westinghouse Electric Corporation, Meter Division, Raleigh, North Carolina.

An interval timing mechanism 14 which forms an important feature of this invention is intended to replace the interval timing mechanism disclosed in the aforementioned publication and U.S. Pat. Nos. 3,136,947 and 3,406,338. As described in these references, the interval timing mechanism resets the pusher associated with a resettable drive means which couples the measuring unit and the demand indicator 12 at the end of a specified period, for example, 15 minutes or 30 minutes which is referred to as the demand interval. The resettable drive mechanism as described in the aforementioned patents includes a cluth, noted further hereinbelow, which opens to disconnect the measuring unit from a pusher driving the demand indicator 12. The pusher is returned to an initial condition at a zero or start position. The pusher is then driven in response to the measuring unit for the predetermined demand interval and if the energy consumed during the demand interval is greater than a preceding interval it will cause the indicator to advance accordingly. If the puher is driven to a maximum condition during a demand interval which is less than a preceding interval then the position of the maximum demand indicator 12 will not be changed. The interval timing mechanism 14 is positioned in the register 10 between a forward dial plate 15 and a rear plate 16. A middle plate 17 and a subplate 18 are supported between the plates 15 and 16 support the mechanism 14. These plates 17 and 18 are fastened to the dial plate 15 and the rear plate 16 by spacers, now shown, and screws 19.

The interval timing mechanism 14 is driven by a synchronous motor M, as described in the aforementioned patents, supported by the rear plate 16 and drives an output gear 20 through a gear reduction drive. The gear 20 rotates at approximately 1 r.p.m. A normally horizontal shaft 21 carries a crown gear 22 meshing with the motor driven gear 20. A gear 24 is fixedly attached to the shaft 21 to provide a continuous rotation at a rate of approximately one-third revolution per minute. A similar arrangement is disclosed in the aforementioned patents.

A shaft 26 disposed parallel to the shaft 21 carries a large gear 27 which has meshing engagement with the gear 24. The gear 27 is fixedly attached to the shaft 26 to form an input for rotating the shaft 26 which has a pair of fixed output gears 28 and 29. The gear 28 drives an interval indicator gear 30 which is connected to a elapsed time pointer, now shown, exposed on the face of the dial plate 15 and corresponds to the time elapsed pointer disclosed in the aforementioned patents.

Figure 3:
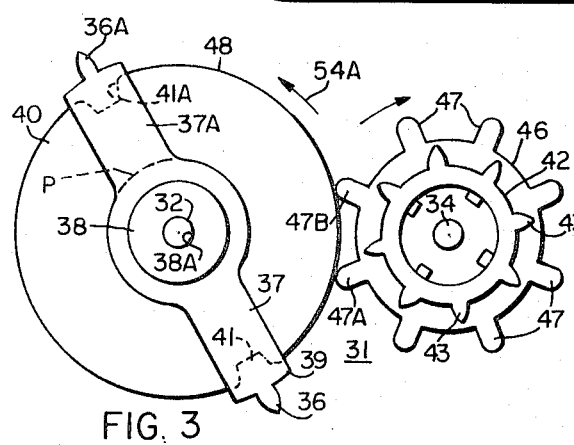
FIG. 3 is an enlarged view of parts removed from FIG. 1.
Figure 4:
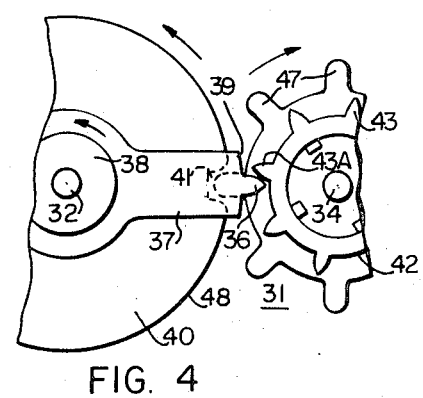
FIG. 4 is a fragmentary view of FIG. 3 showing an alternate operative position of the parts.

An intermittent motion arrangement 31, which provides a salient feature of this invention is supported on the shafts 32 and 34 also parallel to each other and to the shafts 21 and 26. The ends of the shafts are rotatably supported by the plates 17 and 18. A gear 35 is fixedly attached to the shaft 32 which shaft defines an input of the arrangement 31 which is continuously rotated at a constant velocity by the motor drive gear 20. The gears 27 and 29 form idler gears between the gear 24 and the gear 35 on the input shaft 32. A single involute gear tooth projection 36 is formed integrally on an arm 37 extending radially from a hub part 38 having a shaft receiving hole 38A to attach the arm 37 to the shaft 32. The gear tooth projection 36 extends from a radial end 39 of arm 37, as best seen in FIGS. 3 and 4, terminating the radial extremity of the arm 37. The gear tooth projection 36 is formed by a gear hobbing operation which is well understood by those skilled in the art of gear making. An identical arm 37A integral with the arm 37 includes a single gear tooth projection 36A identical to the tooth projection 36 and diametrically disposed at the same radial distance from the shaft 32. The rotation of the arms 37 and 37A provide a 15 minute demand interval. However, in an alternate preferred embodiment, now shown, the arm 37A with the tooth projection 36A is removed along the phantom line P as shown in FIG. 3. This removes the tooth projection 36A to eliminate its driving engagement.

A locking disk 40 is secured to the shaft 32 and includes notches 41 and 41A centered along a diametrical plane extending from the center of the shaft 32 through the middle of the tooth projections 36 and 36A. When the arm 37A is removed the notch 41A is not provided.

The shaft 34 forms an output shaft of the intermittent motion arrangement 31 and fixedly carries an eight tooth gear 42. Each of the teeth 43 of the gear 42 having a complementary involute configuration for engagement by the tooth projection 36 as shown in the enlarged view of the gear 42 in FIG. 3. The mating involute gear configuration of the tooth projections 36 and 36A with the teeth 43 provides a uniform rolling engagement therebetween which is believed to provide some of the important advantages of this invention. In one preferred embodiment the eight teeth 43 have a diametrical pitch based on approximately 48 teeth per inch and are equidistantly spaced. Also, the operational pitch diameter is 0.327 inch in the one preferred embodiment when the centers of the shafts 32 and 34 are spaced 0.634 inch.

A locking gear 46 on shaft 34 includes eight equally spaced gear teeth 47 having substantially straight parallel sides and circular arc tips. The teeth 47 extend to a predetermined height for cooperative engagement with the locking disc 40 as shown for teeth 47A and 47B in FIG. 3. As understood more clearly in connection with the description of FIGS. 3 and 4, the radius of the disk 40 overlaps the outer radius of the teeth 47. Accordingly, a pair of the teeth 47, such as 47A and 47B are engageable with the circular periphery 48 of the disk 40 to prevent rotation of the output shaft 34 when the input shaft 32 is in an intermediate position between the engaging positions of the gear tooth projections 36 and 36A and the gear teeth 43. The eight teeth 43 are fixed to the shaft 34 at a predetermined angle, for example 12°, in a counterclockwise direction as viewed in FIGS. 1 and 3 so that upon engagement of the tooth projection 36 with a gear tooth 43 the notches 41 or 41A receive one of the teeth 47 so as to release the shaft 34 from the locking engagement between the teeth 47 and the disk 40. This release occurs as engagement of the tooth projections 36 and 36A is made with one gear tooth 43A of the teeth 43, as shown in FIG. 4. Normally, the teeth 47 will not engage the sides of the notches 41 and 41A.

The output shaft 34 fixedly supports a gear 50 and has meshing engagement with a gear 123 carried by a shaft N125. The shaft N125 and gear 123 are numbered correspondingly to the shaft N125 and the gear 123 described in the aforementioned U.S. Pat. Nos. 3,136,947 and 3,406,338. As disclosed and claimed in the later patent, the shaft N125 includes a coil spring N32 correspondingly designated to the spring N32 in the U.S. Pat. No. 3,406,338. This affords an adjustment feature between the shaft N125 and the gear 50 as described in this patent.

Figure 2:
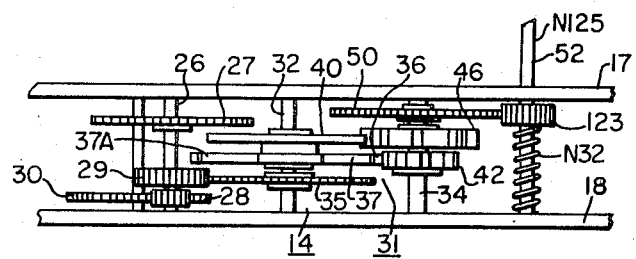
FIG. 2 is a sectional view taken along the axis II—II and looking in the direction of the arrows illustrating a top plan view of the interval timing mechanism of this invention.

As also described in the aforementioned patents the shaft N125 carries a cam assembly shown in FIGS. 1 and 2 of the U.S. Pat. No. 3,406,338 which actuates a cluth N4. This cam is opened to disengage the measuring unit with the demand indicator 12. A sector gear designated N171A in the patent is then actuated by the cam carried on the shaft N125 to return a pusher 65 associated with the resettable drive to the initial condition so as to start at a zero point. This patent notes that the shaft N125 is rotated through 180° twice during each demand interval as controlled by an interval timing mechanism.

Referring again to FIGS. 3 and 4, an enlarged end view of the input shaft 32 shows the arms 37 and 37A utilized for a 15 minute demand interval and the locking disk 40 with a pair of notches 41 and 41A disposed in radial alignment with the tooth projections 36 and 36A The shaft 32 is rotated in a counterclockwise direction as indicated by the arrow 54a and when in the position shown in FIG. 3 the output shaft 34 is maintained stationary by the engagement of two of the teeth 47A and 47B with the periphery 48 of the disk 40. The shaft 32 rotates at approximately one revolution every 15 minutes. Accordingly, as tooth projections 36 and 36A rotate they engage one of the teeth 43 approximately every 7½ minutes. Approximately 7 minutes of this time is considered a dwell time in which the shaft 34 remains stationary. The engagement of a tooth projection 36 with the tooth 43A, as shown in FIG. 4, causes a clockwise rotation of the output shaft 34 through 45° of arcuate movement. A four-to-one gear ratio is provided between the gears 50 and 123 so that upon rotation of the shaft 34 through 45°, the shaft N125 rotates 180°. This 180° rotation is provided in approximately 1/2 minute. Every other 180° rotation of the shaft N125 causes the cam to be positioned to actuate the aforementioned clutch and sector gear. Therefore, each complete revolution of the shaft 32 returns the resettable drive mechanism to the initial condition. The torque required to perform this function is provided by the motor M driving the gear 20 and has been measured to be in the order of 175 centimeter grams which is substantially half of the torque required to be applied to the timing interval mechanism provided in the U.S. Pat. Nos. 3,136,947 and 3,406,338.

In the last-mentioned patents three shafts, designated therein by numerals 161, 149 and 147, carry two tandem operating intermittent motion arrangements also referred to as Geneva drives. Each arrangement includes a slotted disk carrying a pin which cooperatively engages a pair of eight toothed gears in each arrangement. These two tandem intermittent motion arrangements each require that the pin engage a gear tooth having substantially straight sides and then as the intermittent motion is continued the notch engages the gear tooth of an adjacent gear to complete each individual intermittent motion movement. It has been noted in this prior mechanism that two tandem arrangements are required in order to keep the clutch open time within generally prescribed time limits of between 2 to 5 seconds. It is noted that at column 5, lines 72 through 75 of the U.S. Pat. No. 3,136,947 it is suggested that a single intermittent motion arrangement may be employed, however, it has been found that the use of a single intermittent arrangement rather than two such arrangements in tandem operation does not maintain the desired minimum clutch open time of between 2 to 5 seconds. Due to the non-uniform motion imparted by this two tandem intermittent motion arrangement the variation of the clutch open time has been found to sometimes vary for as much as 1 to 6½ seconds. The 2 to 5 second clutch open time is only established when the two intermittent motion arrangements are precisely mounted with respect to each other and to their supporting shafts. Also, torque required at the output of the synchronous motor is substantially more and in the order of 350 centimeter grams in the prior mechanism.

In the interval timing mechanism 14 of this invention, the clutch open time is maintained at a substantially constant maximum time interval variation of approximately 1 second. It was noted that the clutch open time variation remains constant with different radial lengths for the arms 37 and 37A and corresponding changes in the pitch diameter of the gear 42. The reset operation of the resettable drive mechanism was selected to be maintained between 4 to 5 seconds with dimensions noted hereinabove. The 1 second variation provides substantially less variation than the nominal three second variation provided after precision assembly of the prior interval timing mechanism of the aforementioned patents. The making and assembly of fewer parts further enhances the use of this invention. It is believed that the uniform rolling engagements between the involute tooth configurations of the tooth projection 36 and 36A and of the involute gear teeth 43 is important in providing the reduced torque and reduced variation in controlling the time of imparting uniform intermittent rotation to output shaft 34 with a substantially simplified intermittent coupling arrangement between the two shafts 32 and 34.

Although the invention has been described with reference to a certain specific embodiment thereof modifications falling within the spirit and scope of the invention are possible. For example, it is contemplated that demand intervals other than 15 or 30 minutes may be provided, such as 60 minutes, by adjusting the ratio of the gears coupling the motor driven shaft 21 to the input shaft 32.

What we claim is:

1. A maximum demand meter register including a measuring unit, an indicating member for indicating a variable function of the measuring unit, a resettable drive mechanism operating the indicating member in response to the operation of said measuring unit with said resettable drive mechanism being returnable to an initial condition from a driven condition, and an interval timing mechanism for controlling the periodic return operation of said resettable drive mechanism, wherein said interval timing mechanism comprises: an input shaft continuously rotatable at a predetermined timing rate; a single gear tooth projection fixedly supported on said input shaft, said gear tooth projection having an involute configuration extending radially of said input shaft; an output shaft; gear means directly coupling rotation of said output shaft to said resettable drive mechanism; and a multiple tooth gear fixedly supported on said output shaft, each tooth of said multiple tooth gear having an involute configuration corresponding to said involute configuration of said gear tooth projection so as to have a complementary mating relationship therebetween, and each tooth of said multiple tooth gear being intermittently driven through a rolling engagement with said gear tooth projection upon the continuous rotation of said input shaft so that said output shaft is rotated through equal arcuate increments, whereby the intermittent incremental rotations of said output shaft effect the periodic return operations of said resettable drive mechanism to said initial condition.

2. A maximum demand meter register as claimed in claim 1 including two of said gear tooth projections supported on said input shaft in a diametricallly oppositely directed relationship to each other so as to impart two equal intermittent rotations of said output shaft with each complete rotation of said input shaft.

3. A maximum demand meter register as claimed in claim 1 wherein said gear tooth projection is carried on the end of an arm fastened to said input shaft so as to position said gear tooth projection at a predetermined radial distance from said input shaft to effect uniform mating engagement with the teeth of said multiple tooth gear, and wherein the teeth of thhe multiple tooth gear are spaced apart more than the width of each of the teeth.

4. A maximum demand meter register as is claimed in claim 2 including two integral arms extending in opposite diametrical directions from said input shaft, and wherein said two gear tooth projections are diametrically aligned in an integrally attached relationship with the ends of said two arms.

5. A maximum demand meter register as claimed in claim 1 including a locking gear having equally spaced teeth fastened to said output shaft and further including a locking disk fastened to said input shaft for locking engagement by an adjacent two of the locking gear teeth and having a notched pottion positionable to freely receive a locking gear tooth to permit the intermittent rotation of said multiple tooth gear.

6. A maximum demand meter register as claimed in claim 4 wherein said gear means includes an output gear on said output shaft, and a gear supported on a shaft of said resettable drive mechanism for meshing with said output gear, said gear of the resettable drive mechanism being axially displaceable for disengagement from said output gear so as to provide adjustment of the angular positioning of said shaft relative to said output shaft.

* * * * *